US010474055B2

(12) United States Patent
Maeda

(10) Patent No.: US 10,474,055 B2
(45) Date of Patent: Nov. 12, 2019

(54) IMAGE FORMING APPARATUS ADJUSTING DRIVING CURRENT FOR EMITTING LIGHT

(71) Applicant: CANON KABUSHIKI KAISHA, Tokyo (JP)

(72) Inventor: Yasukazu Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/689,492

(22) Filed: Aug. 29, 2017

(65) Prior Publication Data

US 2018/0059570 A1   Mar. 1, 2018

(30) Foreign Application Priority Data

Aug. 30, 2016 (JP) ................ 2016-168585

(51) Int. Cl.
 *G03G 15/04* (2006.01)
 *G03G 15/043* (2006.01)
 *G03G 15/02* (2006.01)
 *H04N 1/113* (2006.01)

(52) U.S. Cl.
 CPC ....... *G03G 15/043* (2013.01); *G03G 15/0216* (2013.01); *G03G 15/04072* (2013.01); *H04N 1/113* (2013.01)

(58) Field of Classification Search
 CPC ............. G03G 15/043; G03G 15/0216; G03G 15/04072; H04N 1/113
 See application file for complete search history.

(56) References Cited

U.S. PATENT DOCUMENTS

| | | | |
|---|---|---|---|
| 2010/0150591 A1* | 6/2010 | Yamashita | B41J 2/473 399/51 |
| 2014/0178086 A1* | 6/2014 | Kitamura | G03G 15/043 399/46 |
| 2014/0347430 A1* | 11/2014 | Maeda | G03G 15/043 347/118 |

FOREIGN PATENT DOCUMENTS

| | | |
|---|---|---|
| JP | H04-120867 A | 4/1992 |
| JP | 2004-153118 A | 5/2004 |
| JP | 2012-137743 A | 7/2012 |
| JP | 2013-254173 A | 12/2013 |

* cited by examiner

*Primary Examiner* — David M. Gray
*Assistant Examiner* — Laura Roth
(74) *Attorney, Agent, or Firm* — Canon U.S.A., Inc. IP Division

(57) ABSTRACT

A period in which an adjustment unit adjusts a driving current such that the light irradiation unit emits a third light emission amount of light is switched to a period in which a light irradiation unit emits a second light emission amount of light, and the period in which the light irradiation unit emits the second light emission amount of light is switched to a period in which the light irradiation unit emits a first light emission amount of light.

15 Claims, 12 Drawing Sheets

FIG.7A
FIRST LIGHT EMISSION AMOUNT

| NUMBER OF PRINTED SHEETS | PHOTOSENSITIVE DRUM (5Y, 5M, 5C, 5K) | LD401Y LD401K LIGHT EMISSION AMOUNT (TARGET VALUE) | LD401M LD401C LIGHT EMISSION AMOUNT (TARGET VALUE) |
|---|---|---|---|
| 0 - 400 | INITIAL | P(a1) | P(b1) |
| 401 - 800 | INTERMEDIATE | P(a2) | P(b2) |
| 801 - 1200 | FINAL | P(a3) | P(b3) |

FIG.7B
SECOND LIGHT EMISSION AMOUNT

| NUMBER OF PRINTED SHEETS | PHOTOSENSITIVE DRUM (5Y, 5M, 5C, 5K) | LD401Y LD401K LIGHT EMISSION AMOUNT (TARGET VALUE) | LD401M LD401C LIGHT EMISSION AMOUNT (TARGET VALUE) |
|---|---|---|---|
| 0 - 400 | INITIAL | P(c1) | P(d1) |
| 401 - 800 | INTERMEDIATE | P(c2) | P(d2) |
| 801 - 1200 | FINAL | P(c3) | P(d3) |

FIG.7C
THIRD LIGHT EMISSION AMOUNT

| NUMBER OF PRINTED SHEETS | PHOTOSENSITIVE DRUM (5Y, 5M, 5C, 5K) | LD401Y, LD401M LD401C, LD401K LIGHT EMISSION AMOUNT (TARGET VALUE) |
|---|---|---|
| 0 - 400 | INITIAL | P(P1) |
| 401 - 800 | INTERMEDIATE | |
| 801 - 1200 | FINAL | |

FIG.10A
FIRST LIGHT EMISSION AMOUNT

| NUMBER OF PRINTED SHEETS | PHOTOSENSITIVE DRUM (5Y, 5M, 5C, 5K) | LD401Y LD401K LIGHT EMISSION AMOUNT (TARGET VALUE) | LD401M LD401C LIGHT EMISSION AMOUNT (TARGET VALUE) |
|---|---|---|---|
| 0 - 400 | INITIAL | P(a1) | P(b1) |
| 401 - 800 | INTERMEDIATE | P(a2) | P(b2) |
| 801 - 1200 | FINAL | P(a3) | P(b3) |

FIG.10B
SECOND LIGHT EMISSION AMOUNT

| NUMBER OF PRINTED SHEETS | PHOTOSENSITIVE DRUM (5Y, 5M, 5C, 5K) | LD401Y LD401K LIGHT EMISSION AMOUNT (TARGET VALUE) | LD401M LD401C LIGHT EMISSION AMOUNT (TARGET VALUE) |
|---|---|---|---|
| 0 - 400 | INITIAL | P(c1) | P(d1) |
| 401 - 800 | INTERMEDIATE | P(c2) | P(d2) |
| 801 - 1200 | FINAL | P(c3) | P(d3) |

FIG.10C
THIRD LIGHT EMISSION AMOUNT

| NUMBER OF PRINTED SHEETS | PHOTOSENSITIVE DRUM (5Y, 5M, 5C, 5K) | LD401Y LD401K LIGHT EMISSION AMOUNT (TARGET VALUE) | LD401M LD401C LIGHT EMISSION AMOUNT (TARGET VALUE) |
|---|---|---|---|
| 0 - 400 | INITIAL | P(M1) | P(N1) |
| 401 - 800 | INTERMEDIATE | P(M2) | P(N2) |
| 801 - 1200 | FINAL | P(M3) | P(N3) |

IMAGE FORMING APPARATUS ADJUSTING DRIVING CURRENT FOR EMITTING LIGHT

BACKGROUND

Field of the Disclosure

The present disclosure relates to an image forming apparatus such as a laser printer, a copying machine, and a facsimile.

Description of the Related Art

Japanese Patent Application Laid-Open No. 2012-137743 discusses a conventional approach for adjusting a potential of a non-image portion (area to which toner is not adhered) of a photosensitive drum to further improve the image quality of an electrophotographic image forming apparatus. Specifically, an image portion (area to which toner is adhered) of the photosensitive drum is irradiated with light that is emitted in a first light emission amount for setting a potential for adhering toner. The non-image portion of the photosensitive drum is irradiated with light that is emitted in a second light emission amount for setting a potential for not adhering toner. The second light emission amount is smaller than the first light emission amount. To stabilize the first and second light emission amounts, auto power control (APC) for adjusting the two levels of light emission amounts, i.e., the first light emission amount and the second light emission amount, is discussed to be performed.

APC is usually performed in a period between when one line of a normal image is scanned over the photosensitive drum in a main scanning direction and when the next line is scanned. If laser light is emitted for APC, stray light may occur. As illustrated in FIG. 12, the laser emission therefore can be controlled to stop between after the two levels of APC on the first and second light emission amounts are performed and before light emission for forming a normal image is performed.

Laser elements have a characteristic called droop in which the amount of emitted light varies with a change in element temperature. As illustrated in FIG. 12, if the laser emission is stopped to prevent stray light between the end timing (t1) of the APC on the second light emission amount and the start timing (t2) of weak emission of the second light emission amount for the non-image portion, the temperature of the laser element drops. As a result, droop occurs at the start timing (t2) of the weak emission of the second light emission amount for the non-image portion, and the amount of emitted light becomes higher than desired. The rate or effect of change in the amount of emitted light due to droop increases as the amount of emitted light decreases. Under the effect of the droop, the photosensitive drum is exposed to a greater amount of emitted light than the desired second light emission amount. The drum potential can thus be lower than a desired value, in which case an image defect such as fogging can occur.

SUMMARY

According to an aspect of the present disclosure, an image forming apparatus includes a charging unit configured to charge a photosensitive member, a light irradiation unit configured to emit a first light emission amount of light for forming an electrostatic latent image in an image portion, a second light emission amount of light for controlling a potential of a non-image portion, and an adjustment unit configured to adjust a driving current to be supplied to the light irradiation unit so as to adjust an amount of the light emitted from the light irradiation unit, wherein a period in which the adjustment unit adjusts the driving current is switched to a period in which the light irradiation unit emits the second light emission amount of light, and the period in which the light irradiation unit emits the second light emission amount of light is switched to a period in which the light irradiation unit emits the first light emission amount of light such that the light irradiation unit emits the third light emission amount of light.

Further features of the present disclosure will become apparent from the following description of exemplary embodiments with reference to the attached drawings.

BRIEF DESCRIPTION OF THE DRAWINGS

FIGS. 7A, 7B, and 7C are diagrams illustrating a relationship between use states of photosensitive drums and target values of light emission amounts of corresponding laser diodes according to one or more aspects of the present disclosure.

FIGS. 10A, 10B, and 10C are diagrams illustrating a relationship between the use states of the photosensitive drums and the target values of the light emission amounts of the corresponding laser diodes according to one or more aspects of the present disclosure.

DESCRIPTION OF THE EMBODIMENTS

An exemplary embodiment of the present disclosure will be described below with reference to the drawings. The following exemplary embodiment is not intended to limit the disclosure according to the claims, and all combinations of features described in the exemplary embodiment are not necessarily indispensable to the solving means of the disclosure.

[Image Forming Apparatus]

Figure 1:
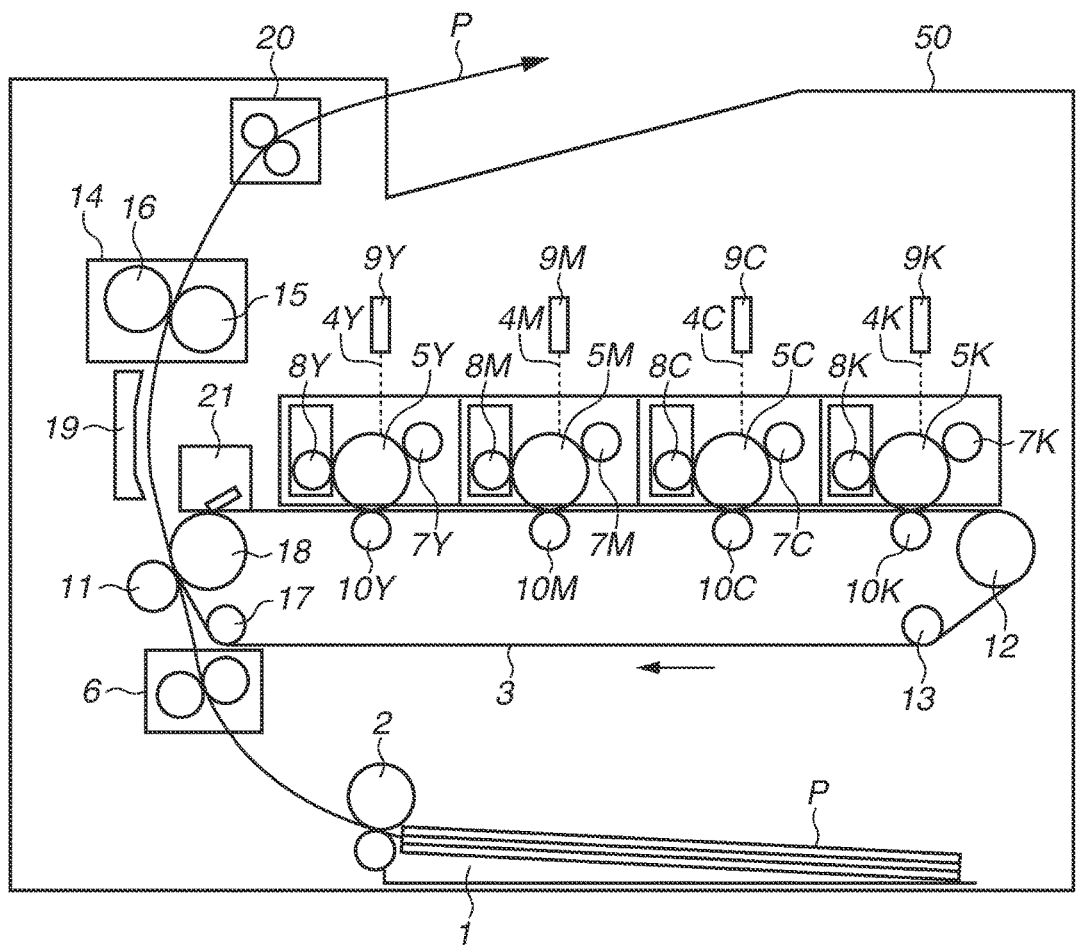
FIG. 1 is a schematic configuration diagram of an image forming apparatus according to one or more aspects of the present disclosure.

A first exemplary embodiment will be described below. FIG. 1 is a schematic configuration diagram of an image forming apparatus which forms a color image by superposing yellow (Y), magenta (M), cyan (C), and black (K), four color images using electrophotographic processes. In the following description, suffixes Y, M, C, and K to the reference numerals of members of which no particular distinction is needed between yellow, magenta, cyan, and black may be omitted for convenience of description.

An image forming apparatus 50 is a printer including photosensitive drums 5 (5Y, 5M, 5C, and 5K) serving as photosensitive members. The printer sequentially transfers toner images formed on the photosensitive drums 5 onto an intermediate transfer belt 3 in a multiple manner to obtain a full-color image. The intermediate transfer belt 3 is laid across a driving roller 12, a tension roller 13, an idler roller 17, and a secondary transfer counter roller 18. The intermediate transfer belt 3 rotates in the direction of the arrow in FIG. 1. The four photosensitive drums 5 are arranged in series in a moving direction of the intermediate transfer belt 3. The photosensitive drums 5 are uniformly charged to a predetermined polarity and potential by charging rollers 7, and then irradiated with laser beams 4Y, 4M, 4C and 4K from scanner units 9Y, 9M, 9C and 9K (also collectively referred to as an optical scanning device 9), respectively. Electrostatic latent images are thereby formed. Developing rollers 8 as development units apply toner to the electrostatic latent images, whereby the electrostatic latent images are developed into toner images. Images are thereby visualized.

Although not illustrated in the diagram, the charging rollers 7Y, 7M, 7C, and 7K are supplied with a charging bias from a common charging high-voltage power supply. The developing rollers 8Y, 8M, 8C, and 8K are similarly supplied with a developing bias from a common developing high-voltage power supply. The common high-voltage power supplies for the plurality of charging rollers 7 and developing rollers 8 enable further miniaturization of the image forming apparatus 50. Costs can be suppressed, compared to when transformers of variable output voltages are provided for the respective colors and the input voltages to the charging rollers 7 and the developing rollers 8 are independently controlled. Costs can also be suppressed, compared to when direct-current-to-direct-current (DC-DC) converters (variable regulators) are provided for the respective charging rollers 7 and developing rollers 8 and the output of a single transformer is controlled for the charging rollers 7 and the developing rollers 8 independently.

The images formed on the photosensitive drums 5 enter primary transfer portions with the intermediate transfer belt 3. In the primary transfer portions, primary transfer rollers 10 are put in contact with the back side of the intermediate transfer belt 3. A not-illustrated primary transfer bias power supply for enabling bias application is connected to the primary transfer rollers 10. A yellow image is primarily transferred from the photosensitive drum 5Y to the intermediate transfer belt 3. A magenta image, a cyan image, and a black image are then primarily transferred from the photosensitive drums 5M, 5C, and 5K to the intermediate transfer belt 3, respectively. A color image is thereby formed on the intermediate transfer belt 3.

Recording materials P are stacked and stored in a sheet cassette 1. A recording material P is fed by a feeding roller 2, and conveyed to and temporarily stopped at a nip portion of a registration roller pair 6. The recording material P temporarily stopped is conveyed to a secondary transfer portion by the registration roller pair 6 in synchronization with timing when the image formed on the intermediate transfer belt 3 reaches the secondary transfer portion. A secondary transfer bias is applied to a secondary transfer roller 11, whereby the image on the intermediate transfer belt 3 is secondarily transferred onto the recording material P. The recording material P to which the image is secondarily transferred is separated from the intermediate transfer belt 3 and conveyed to a fixing device 14 via a conveyance guide 19. A fixing roller 15 and a pressure roller 16 here apply heat and pressure to the recording material P, whereby the image is melted and fixed to the recording material P. The recording material P is then discharged from a discharge roller pair 20 to outside the image forming apparatus 50. Meanwhile, toner remaining on the intermediate transfer belt 3 without being transferred to the recording material P in the secondary transfer portion is removed by a cleaning unit 21 which is arranged downstream of the secondary transfer portion.

[Optical Scanning Device]

Figure 2:
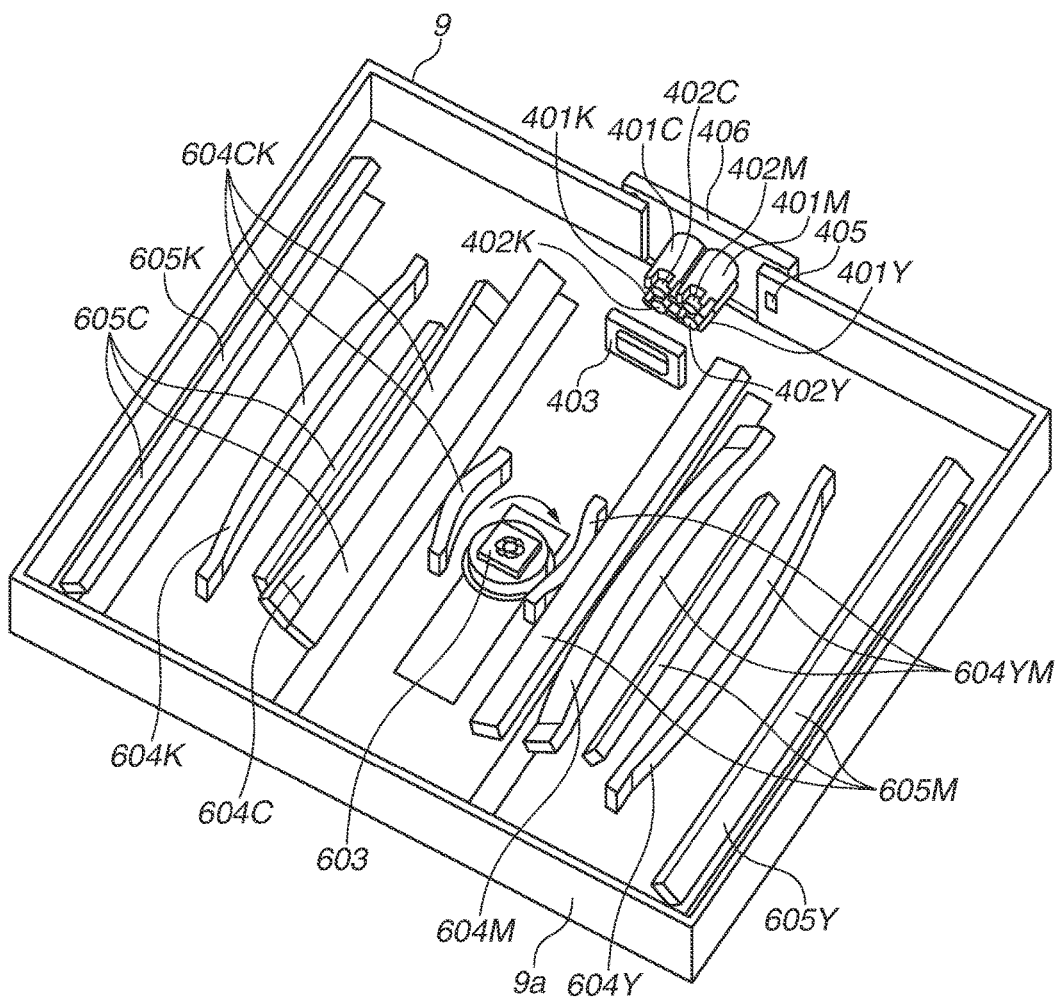
FIG. 2 is a schematic configuration diagram of an optical scanning device according to one or more aspects of the present disclosure.

Next, the optical scanning device 9 serving as a light irradiation unit will be described in detail. FIG. 2 is a schematic perspective view of the optical scanning device 9. The optical scanning device 9 irradiates the four photosensitive drums 5Y to 5K with laser beams 4Y to 4K. The optical scanning device 9 accommodates the following members in an optical box 9a. Light sources 401 (401Y, 401M, 401C, and 401K) which are semiconductor lasers, collimator lenses 402 (402Y, 402M, 402C, and 402K), an anamorphic lens 403, a rotating polygon mirror 603, fθ lenses 604 (604YM, 604CK, 604Y, 604M, 604C, and 604K), mirrors 605 (605Y, 605M, 605C, and 605K), and a beam detector (BD) sensor 405. The optical scanning device 9 further includes laser driving circuits 406 for making the light sources 401 emit light.

Figure 3A:
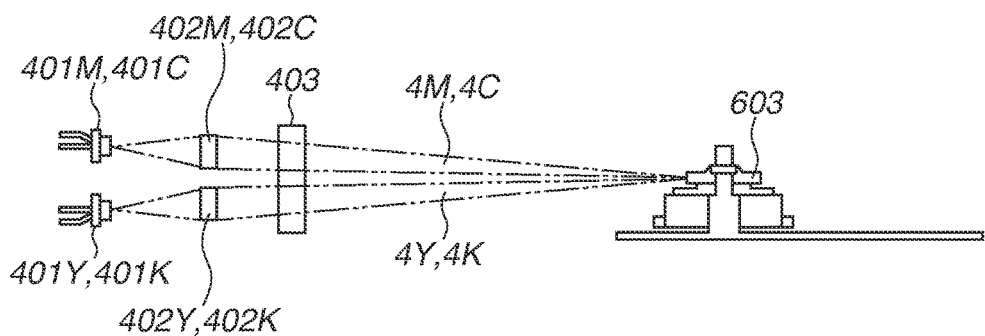
FIGS. 3A and 3B are diagrams illustrating optical paths of laser beams emitted from light sources according to one or more aspects of the present disclosure.
Figure 3B:
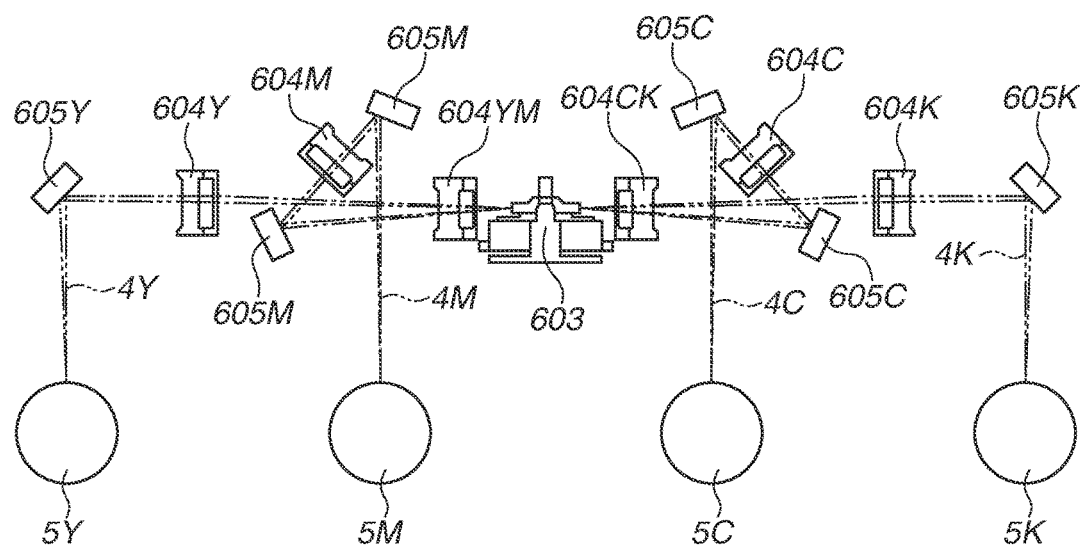

Referring to FIGS. 3A and 3B, the optical paths of the laser beams 4 emitted from the respective light sources 401 will be described. FIG. 3A is a diagram illustrating the optical paths from the light sources 401 to the rotating polygon mirror 603. The laser beams 4 emitted from the respective light sources 401 are collimated into parallel beams through the corresponding collimator lenses 402. The parallel beams are transmitted through the anamorphic lens 403 and, in a predetermined configuration, incident and focused on reflection surfaces of the rotating polygon mirror 603. FIG. 3B is a diagram illustrating the optical paths from the rotating polygon mirror 603 to the plurality of photosensitive drums 5. The laser beams 4Y and 4M reflected from the rotating polygon mirror 603 are transmitted through the fθ lens 604YM and the respective fθ lenses 604Y and 604M, reflected in predetermined directions from the mirror 605Y and 605M, and finally projected and focused on the photosensitive drums 5Y and 5M. The laser beams 4C and 4K reflected from the rotating polygon mirror 603 are transmitted through the fθ lens 604CK and the respective fθ lenses 604C and 604K, reflected in predetermined directions from the mirrors 605C and 605K, and finally projected and focused on the photosensitive drums 5C and 5K.

The rotating polygon mirror 603 rotates in the direction of the arrow in FIG. 2, whereby the spots formed by the laser beams 4 are moved over the photosensitive drums 5 in a main scanning direction (direction of the rotation axes of the photosensitive drums 5) to form scan lines on the photosensitive drums 5. Reflecting the laser beams 4 by the rotating polygon mirror 603 to move the spots over the photosensitive drum 5 and form scan lines will be referred to as a deflection scan (main scan). Rotating the photosensitive drums 5 to form new scan lines on the photosensitive drums 5 in a sub scanning direction will be referred as a sub scan.

The BD sensor 405 of FIG. 2 is arranged in a position in which the laser beam 4Y emitted from the light source 401Y and reflected by the rotating polygon mirror 603 can be received. The position is located outside a weak emission area of a non-image portion. The BD sensor 405 receives the laser beam 4Y emitted from the light source 401Y and reflected by the rotating polygon mirror 603 at timing after the laser beam 4Y finishes scanning one line and before the laser beam 4Y scans the next line. The BD sensor 405 generates a BD signal (horizontal synchronization signal) according to the reception of the laser beam 4Y. Based on the BD signal, the timing to start the irradiation of the photosensitive drums 5 with the laser beams 4Y to 4K to form scan lines is determined.

The optical scanning device 9 irradiates image portions of the photosensitive drums 5 to which toner is adhered with the laser beams 4 emitted in a first light emission amount. The first light emission amount is intended to set the surface potentials of the photosensitive drums 5 to a potential such that toner adheres according to image gradations. To adjust the potentials of non-image portions of the photosensitive drum 5 to which toner is not adhered, the optical scanning device 9 further irradiates the non-image portions with the laser beams 4 emitted in a second light emission amount smaller than the first light emission amount. The second light emission amount is intended to set the surface potentials of the photosensitive drums 5 to a potential for not adhering toner. The light emission of the second light emission amount of laser beams 4 to the non-image portions of the photosensitive drums 5 can set the potentials of the non-image portions of the photosensitive drums 5 to a potential at which toner fogging, reversal fogging, and involvement of an electrical field of the image portions are suppressed.

As illustrated in FIGS. 2, 3A, and 3B, the numbers of mirrors 605 arranged on the optical paths of the laser beams 4M and 4C and those on the optical paths of the laser beams 4Y and 4K are different so that the optical path lengths from the light sources 401 to the respective corresponding photosensitive drums 5 are the same. More specifically, two mirrors 605M or 605C are provided for each of the laser beams 4M and 4C with which the photosensitive drums 5M and 5C at close distances from the rotating polygon mirror 603 are irradiated. One mirror 605Y or 605K is provided for each of the laser beams 4Y and 4K. In general, a laser beam attenuates slightly in the amount of light when reflected by a mirror. The laser beams 4M and 4C with a greater number of mirrors 605 thus attenuate more in the amount of light before reaching the photosensitive drums 5. If the photosensitive drums 5 are irradiated with the same amount of light, the light emission amounts of the light sources 401Y to 401K are set so that the light sources 401M and 401C emit a greater amount of light than the light sources 401Y and 401K do.

[Laser Driving Circuit]

Figure 4:
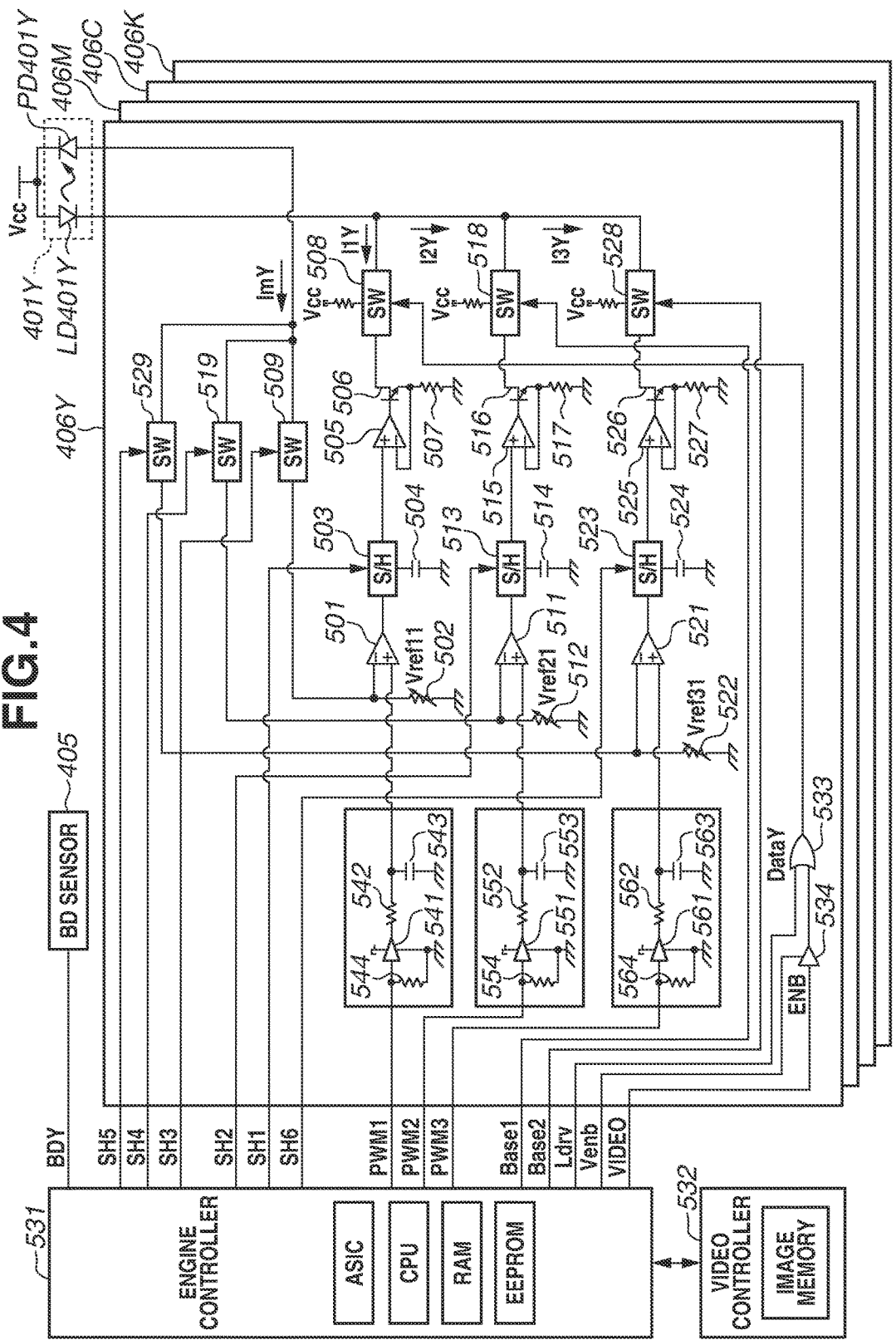
FIG. 4 is a diagram illustrating a laser driving circuit according to one or more aspects of the present disclosure.

Next, the laser driving circuits 406 (406Y, 406M, 406C, and 406K) for making the light sources 401 of the optical scanning device 9 emit light will be described. FIG. 4 is a diagram illustrating the laser driving circuits 406 as a switching unit. The laser driving circuits 406 are provided for the respective light sources 401. Since all the laser driving circuits 406 have the same configuration and operation, the light source 401Y and the laser driving circuit 406Y driving the same will be described in an exemplary manner. A description of the rest of the laser driving circuits 406 will be omitted. The laser driving circuits 406Y to 406K are arranged on a single substrate. In FIG. 2, the substrate on which the laser driving circuits 406Y to 406K are arranged is therefore illustrated as a laser driving circuit 406.

The laser driving circuit 406Y is connected with the light source 401Y, an engine controller 531, and a video controller 532. The light source 401Y includes a laser diode LD401Y serving as a light emitting element and a photodiode PD401Y serving as a light receiving element.

An application specific integrated circuit (ASIC), a central processing unit (CPU), a random access memory (RAM), and an electrically erasable programmable read-only memory (EEPROM) are built in the engine controller 531 as a control unit. The engine controller 531 controls operations of various parts of the image forming apparatus including the optical scanning device 9. The engine controller 531 is connected with the BD sensor 405, and the foregoing BD signal is input to the engine controller 531. The engine controller 531 determines the timing to make the laser diode LD401Y emit light with reference to the BD signal. The video controller 532 generates a VIDEO signal for making the laser diode LD401Y emit light, based on print data transmitted from an external apparatus such as an externally-connected reader scanner and a host computer.

The laser driving circuit 406Y includes the following members. Comparator circuits 501, 511, and 521, variable resistors 502, 512, and 522, sample-and-hold circuits 503, 513, and 523, holding capacitors 504, 514, and 524, operational amplifiers 505, 515, and 525, transistors 506, 516, and 526, switching current setting resistors 507, 517, and 527, switching circuits 508, 509, 518, 519, 528, and 529, inverters 541, 551, and 561, resistors 542, 552, and 546 for smoothing a PWM1 signal, a PWM2 signal, and a PWM3 signal, capacitors 543, 553, and 563 for smoothing the PWM1, PWM2, and PWM3 signals, and pull-down resistors 544, 554, and 564. As will be described in detail below, the parts 501 to 509 and 541 to 544 correspond to a first adjustment unit of the first light emission amount. The parts 511 to 519 and 551 to 554 correspond to a second adjustment unit of the second light emission amount. The parts 521 to 529 and 561 to 564 correspond to a third adjustment unit of the third light emission amount.

The laser driving circuit 406Y includes an OR circuit 533. An Ldrv signal from the engine controller 531 and the VIDEO signal from the video controller 532 are input to the OR circuit 533. An output signal DATA of the OR circuit 533 is connected to the switching circuit 508.

The VIDEO signal output from the video controller 532 is input to a buffer 534 with an enable terminal. An output of the buffer 534 is connected to the foregoing OR circuit 533. The enable terminal is connected to a Venb signal from the engine controller 531. The engine controller 531 is connected so that an SH1 signal, an SH2 signal, an SH3 signal, an SH4 signal, an SH5 signal, an SH6 signal, a Base1 signal, and a Base2 signal to be described below, the Ldrv signal, and the Venb signal are output to the laser driving circuit 406Y.

A first reference voltage Vref11, a second reference voltage Vref21, and a third reference voltage Vref31 are input to positive terminals of the comparator 501, 511, and 521, respectively. Outputs of the comparator circuits 501, 511, and 521 are input to the sample-and-hold circuits 503, 513, and 523, respectively. The reference voltage Vref11 is set as a target voltage for making the laser diode LD401Y emit the first light emission amount of light. The reference voltage Vref21 is set as a target voltage of the second light emission amount. The reference voltage Vref31 is set as a target voltage of the third light emission amount. The PWM1 signal (duty value), the PWM2 signal (duty value), and the PWM3 signal (duty value) are reference values for setting the reference voltages Vref11, Vref21, and Vref31. The PWM1, PWM2, and PWM3 signals are input from the engine controller 531. The sample-and-hold circuits 503, 513, and 523 are connected with the holding capacitors 504, 514, and 524, respectively. Outputs of the holding capacitors 504, 514, and 524 are input to positive terminals of the operational amplifiers 505, 515, and 525, respectively.

A negative terminal of the operational amplifier 505 is connected with the switching current setting resistor 507 and the emitter terminal of the transistor 506. An output of the operational amplifier 505 is input to the base terminal of the transistor 506. A negative terminal of the operational amplifier 515 is connected with the switching current setting resistor 517 and the emitter terminal of the transistor 516. An output of the operational amplifier 515 is input to the base terminal of the transistor 516. A negative terminal of the operational amplifier 525 is connected with the switching current setting resistor 527 and the emitter terminal of the transistor 526. An output of the operational amplifier 525 is input to the base terminal of the transistor 526. The collector terminals of the transistors 506, 516, and 526 are connected to the switching circuits 508, 518, and 528, respectively. The operational amplifiers 505, 515, and 525, the transistors 506, 516, and 526, and the switching current setting resistors 507, 517, and 527 determine driving currents I1Y, I2Y, and I3Y of the laser diode LD401Y according to the output voltages of the sample-and-hold circuits 503, 513, and 523.

The switching circuit 508 turns on/off according to a pulse modulation data signal DataY. The switching circuit 518 turns on/off according to the Base1 signal. The switching circuit 528 turns on/off according to the Base2 signal. Output terminals of the switching circuits 508, 518, and 528 are connected to the cathode of the laser diode LD401Y, and supply the driving currents I1Y, I2Y, and I3Y thereto. The anode of the laser diode LD401Y is connected to a power supply Vcc. The cathode of the photodiode PD401Y monitoring the light amount (light emission intensity) of the laser diode LD401Y is connected to the power supply Vcc. The anode of the photodiode PD401Y is connected to the switching circuits 509, 519, and 529. During auto power control (APC), a monitoring current ImY is passed through the variable resistors 502, 512, and 522, whereby the monitoring current ImY is converted into monitoring voltages VmY (Vm1Y, Vm2Y, and Vm3Y). The monitoring voltages VmY are input to negative terminals of the comparators 501, 511, and 521.

The SH1 signal output from the engine controller 531 is a signal for switching between a sampling state and a holding state of the sample-and-hold circuit 503 to be described below. The SH2 signal is a signal for switching between a sampling state and a holding state of the sample-and-hold circuit 513 to be described below. The SH3 signal is a signal for switching on/off the switching circuit 509. The SH4 signal is a signal for switching on/off the switching circuit 519. The SH5 signal is a signal for switching on/off the switching circuit 529. The SH6 signal is a signal for switching between a sampling state and a holding state of the sample-and-hold circuit 523 to be described below.

The PWM1, PWM2, and PWM3 signals are signals for setting the reference voltages Vref11, Vref21, and Vref31 to be described below, respectively. The Base1 signal is a signal for switching on/off the switching circuit 518. The Base2 signal is a signal for switching on/off the switching circuit 528. The Ldrv signal is input to the OR circuit 533. The Ldrv signal is a signal for switching on/off the DataY signal. The Venb signal is connected to the enable terminal of the buffer 534 with an enable terminal. The Venb signal is a signal for switching on/off the VIDEO signal input from the video controller 532 to the buffer 534 with an enable terminal.

In FIG. 4, the laser driving circuits 406, the engine controller 531, and the video controller 532 are described to be configured as separate members. However, this is not restrictive. For example, part of or all the laser driving circuits 406 and the video controller 532 may be built in the engine controller 531.

[Third Light Emission Amount APC]

Next, third light emission amount APC will be described with reference to FIG. 4. As illustrated in FIG. 4, the engine controller 531 switches the sample-and-hold circuit 503 to the holding state by an instruction of the SH1 signal. The engine controller 531 also switches the sample-and-hold circuit 513 to the holding state by an instruction of the SH2 signal, and switches the sample-and-hold circuit 523 to the sampling state by an instruction of the SH6 signal. The engine controller 531 turns the switching circuit 509 off by an instruction of the SH3 signal, turns the switching circuit 519 off by an instruction of the SH4 signal, and turns the switching circuit 529 on by an instruction of the SH5 signal. The engine controller 531 turns the switching circuit 508 off by the DataY signal. Concerning the DataY signal, the engine controller 531 disables the Venb signal connected to the enable terminal of the buffer 534 with an enable terminal, and controls the Ldrv signal to turn off the DataY signal. The engine controller 531 turns the switching circuit 518 off by the Base1 signal and turns the switching circuit 528 on by the Base2 signal, whereby the laser diode LD401Y is set to a light emission state of the third light emission amount.

In such a state, the driving current I3Y is supplied to the laser diode LD401Y and the laser diode LD401Y emits light. The photodiode PD401Y as a detection unit receives the light emitted from the laser diode LD401Y, and generates a monitoring current ImY proportional to the amount of light received. The monitoring current ImY is passed through the variable resistor 522, whereby the monitoring current ImY is converted into a monitoring voltage Vm3Y. The comparator 521 adjusts the driving current I3Y of the laser diode LD401Y via the operational amplifier 525 so that the monitoring voltage Vm3Y coincides with the reference voltage Vref31. The holding capacitor 524 is thereby charged or discharged. The engine controller 531 then switches the sample-and-hold circuit 523 to the holding state by an instruction of the SH6 signal, whereby the third light emission amount APC is completed.

Figure 5:
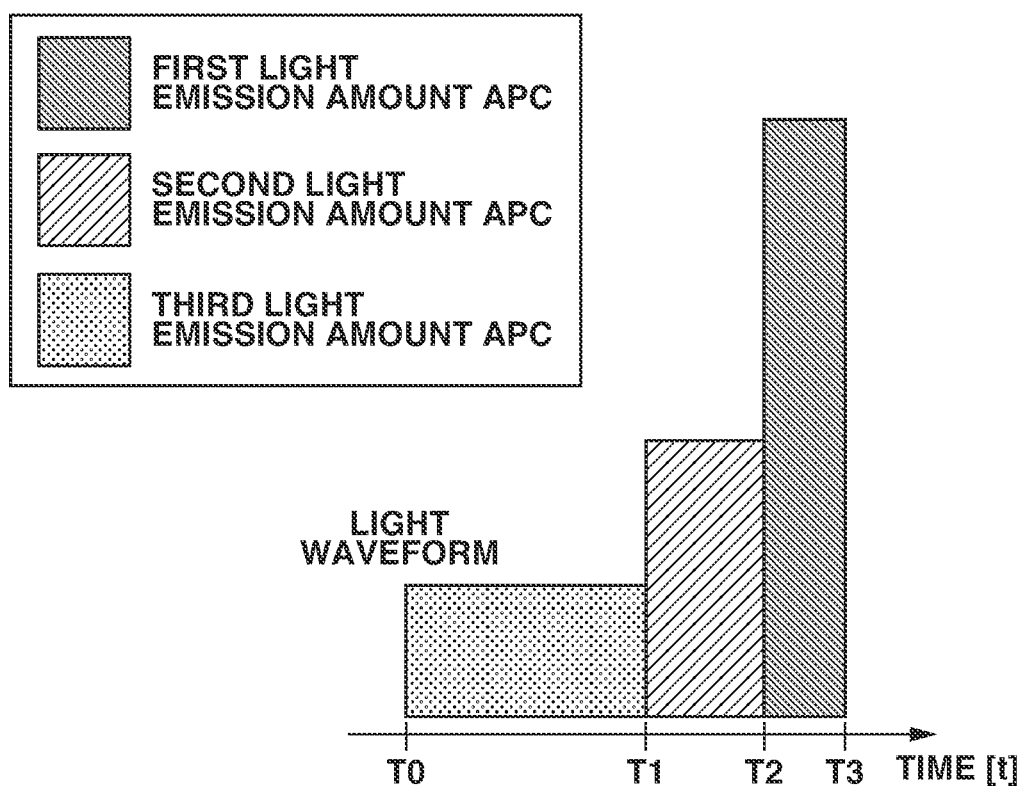
FIG. 5 is a diagram illustrating order of auto power controls (APCs) during an initial operation of the image forming apparatus according to one or more aspects of the present disclosure.
Figure 9:
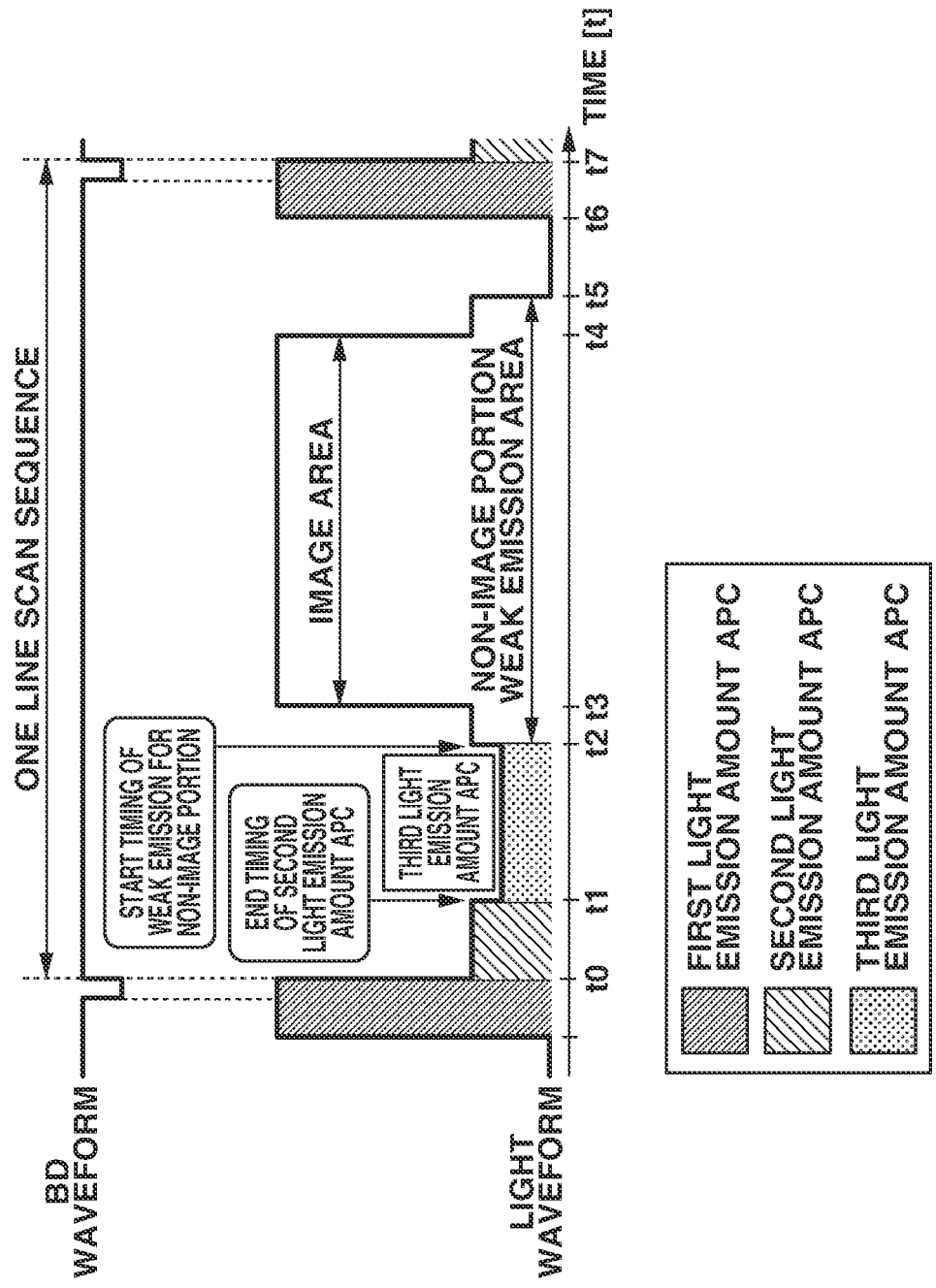
FIG. 9 is a diagram illustrating APCs in one line scan sequence according to one or more aspects of the present disclosure.

The third light emission amount (I3Y) thus APCed is a light emission amount smaller than the lower limit value of a second light emission amount used for weak emission to be described below. If the holding capacitor 524 is yet to be charged, like when the image forming apparatus 50 makes an initial operation, the third light emission amount APC is controlled to be completed before first light emission amount APC and second light emission amount APC are performed as illustrated in FIG. 5. During a steady operation like when the image forming apparatus 50 is forming an image, the third light emission APC is performed within one line scan sequence as illustrated in FIG. 9 to be described below.

[Second Light Emission Amount APC]

The second light emission amount APC will be described with reference to FIG. 4. As illustrated in FIG. 4, the engine controller 531 switches the sample-and-hold circuit 503 to the holding state by an instruction of the SH1 signal. The engine controller 531 switches the sample-and-hold circuit 513 to the sampling state by an instruction of the SH2 signal, and switches the sample-and-hold circuit 523 to the holding state by an instruction of the SH6 signal. The engine controller 531 turns the switching circuit 509 off by an instruction of the SH3 signal, turns the switching circuit 519 on by an instruction of the SH4 signal, and turns the switching circuit 529 off by an instruction of the SH5 signal. The engine controller 531 turns the switching circuit 508 off by the DataY signal. Concerning the DataY signal, the engine controller 531 disables the Venb signal connected to the enable terminal of the buffer 534 with an enable terminal, and controls the Ldrv signal to turn off the DataY signal. The engine controller 531 turns the switching circuit 518 on by the Base1 signal and turns the switching circuit 528 on by the Base2 signal, whereby the laser diode LD401Y is set to a light emission state of the second light emission amount.

In such a state, a driving current I2Y+I3Y obtained by adding the driving current I3Y to the driving current I2Y is supplied to the laser diode LD401Y, and the laser diode LD401Y emits light. The photodiode PD401Y receives the light emitted from the laser diode LD401Y, and generates a monitoring current ImY proportional to the amount of light received. The monitoring current ImY is passed through the variable resistor 512, whereby the monitoring current ImY is converted into a monitoring voltage Vm2Y. The comparator 511 adjusts the driving current I2Y+I3Y of the laser diode LD401Y via the operational amplifier 515 so that the monitoring voltage Vm2Y coincides with the reference voltage Vref21. Since the sample-and-hold circuit 523 is in the holding state, the driving current I3Y has a fixed value. To adjust the driving current I2Y+I3Y, the comparator 511 therefore adjusts the driving current I2Y, whereby the holding capacitor 514 is charged or discharged. The engine controller 531 then switches the sample-and-hold circuit 513 to the holding state by an operation of the SH2 signal, whereby the second light emission amount APC is completed.

When not in an APC operation, i.e., when the photosensitive drum 5Y is irradiated with light, the sample-and-hold circuits 513 and 523 are in the holding state. The voltages charged in the holding capacitors 514 and 524 are maintained. A constant driving current I2Y+I3Y is then supplied so that the laser diode LD401Y maintains the desired second light emission amount of weak emission. The second light emission amount (I2Y+I3Y) is a light emission amount intended to set the potential on the surface of the photosensitive drum 5Y to a potential for preventing fogging and reversal fogging so that toner does not adhere to the photosensitive drum 5Y. The second light emission amount (I2Y+I3Y) is a light emission amount for making the laser diode LD401Y emit laser light. That is, the driving current I2Y+I3Y is a current higher than a threshold current for emitting laser light.

If the holding capacitor 514 is yet to be charged, like during an initial operation of the image forming apparatus 50, the second light emission amount APC is controlled to be completed after the third light emission amount APC is performed and before the first light emission amount APC is performed as illustrated in FIG. 5. During a steady operation like when the image forming apparatus 50 is performing image formation, the second light emission APC is performed within one line scan sequence as illustrated in FIG. 9 to be described below.

[First Light Emission Amount APC]

The first light emission amount APC will be described with reference to FIG. 4. As illustrated in FIG. 4, the engine controller 531 switches the sample-and-hold circuit 503 to the sampling state by an instruction of the SH1 signal. The engine controller 531 switches the sample-and-hold circuit 513 to the holding state by an instruction of the SH2 signal, and switches the sample-and-hold circuit 523 to the holding state by an instruction of the SH6 signal. The engine controller 531 turns the switching circuit 509 on by an instruction of the SH3 signal, turns the switching circuit 519 off by an instruction of the SH4 signal, and turns the switching circuit 529 off by an instruction of the SH5 signal. The engine controller 531 turns the switching circuit 508 on by an instruction of the Ldrv signal, and turns the switching circuit 518 on by an instruction of the Base1 signal. The engine controller 531 turns the switching circuit 528 on by an instruction of the Base2 signal.

In such a state, a driving current I1Y+I2Y+I3Y obtained by adding the driving currents I2Y and I3Y to the driving current I1Y is supplied to the laser diode LD401Y, and the laser diode LD401Y emits light. The photodiode PD401Y receives the light emitted from the laser diode LD401Y, and generates a monitoring current ImY proportional to the amount of light received. The monitoring current ImY is passed through the variable resistor 502, whereby the monitoring current ImY is converted into a monitoring voltage Vm1Y. The comparator 501 adjusts the driving current I1Y+I2Y+I3Y of the laser diode LD401Y via the operational amplifier 505 so that the monitoring voltage Vm1Y coincides with the reference voltage Vref11. Since the sample-and-hold circuits 513 and 523 are in the holding state, the driving currents I2Y and I3Y are fixed in value. To adjust the driving current I1Y+I2Y+I3Y, the comparator 501 adjusts the driving current I1Y, whereby the holding capacitor 504 is charged or discharged. The engine controller 531 then switches the sample-and-hold circuit 503 to the holding state by an instruction of the SH1 signal, whereby the first light emission amount APC is completed.

When not in an APC operation, i.e., when the photosensitive drum 5Y is irradiated with light, the sample-and-hold circuits 503, 513, and 523 are in the holding state. The voltages charged in the holding capacitors 504, 514, and 524 are maintained so that the driving current I1Y+I2Y+I3Y can be supplied. The laser diode LD401Y emits the desired first light emission amount of light to irradiate the photosensitive drum 5Y. The potential on the surface of the photosensitive drum 5Y is thereby set to the potential for adhering toner to the photosensitive drum 5Y. In other words, an electrostatic latent image according to image data is formed on the photosensitive drum 5Y.

If the holding capacitor 504 is yet to be charged, like during an initial operation of the image forming apparatus 50, the first light emission amount APC is controlled to be performed after the third and second light emission amount APCs are completed as illustrated in FIG. 5. During a steady operation like when the image forming apparatus 50 is forming an image, the first light emission APC is performed within one line scan sequence as illustrated in FIG. 9 to be described below.

The engine controller 531 can perform APC on the laser diode LD401Y with the first, second, and third light emission amounts by operating the laser driving circuit 406Y as described above.

[Light Emission Amount Control According to Film Thicknesses of Photosensitive Drums 5]

Next, the need to change the light emission amounts according to the film thicknesses of the photosensitive drums 5 will be described. The image forming apparatus 50 uses a common charging high-voltage power supply and a common developing high-voltage power supply for cost reduction and miniaturization. The image forming apparatus 50 is thus configured to output substantially the same charging voltages Vcdc and developing voltages Vdc to the photosensitive drums 5Y to 5K.

As the use of the photosensitive drums 5 progresses, the surfaces of the photosensitive drums 5 degrade due to discharges from the charging rollers 7. The surfaces of the photosensitive drums 5 are slid against and shaved by not-illustrated cleaning blades for cleaning residual toner off the photosensitive drums 5, and decrease in film thickness. Suppose that the photosensitive drums 5 are charged by the charging rollers 7 to which the same charging voltage Vcdc is applied. In such a case, the smaller the film thickness of a photosensitive drum 5, the higher the charging potential Vd charged by the charging roller 7. If there are photosensitive drums 5 having different film thicknesses and the same charging voltage Vcdc is applied to all the photosensitive drums 5 by the common charging high-voltage power supply, the charging potentials Vd on the surfaces of the photosensitive drums 5 vary with the film thicknesses of the photosensitive drums 5. The greater the film thickness of a photosensitive drum 5, the smaller the absolute value of the charging potential Vd on the surface of the photosensitive drum 5. The smaller the film thickness, the greater the absolute value of the charging potential Vd on the surface of the photosensitive drum 5.

Figure 6A:
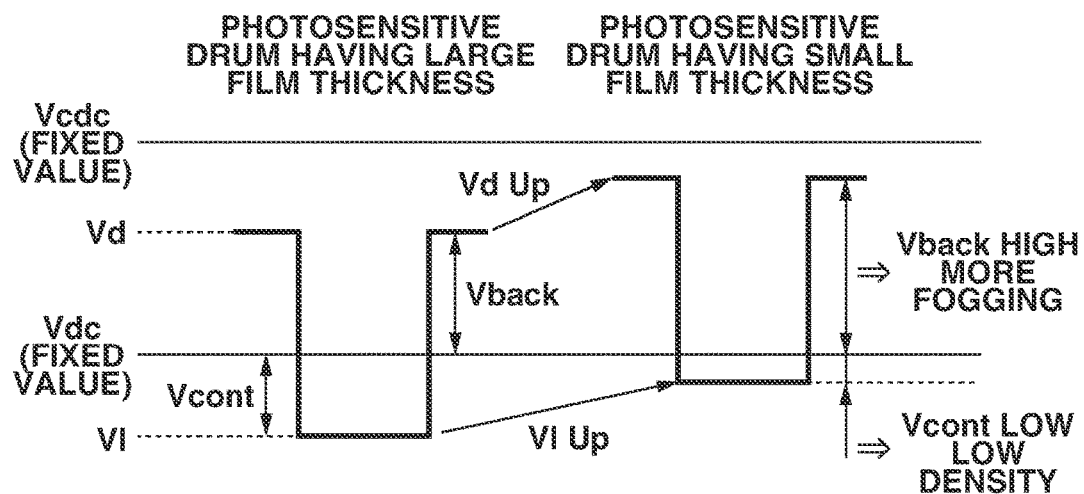
FIGS. 6A and 6B are diagrams illustrating potentials of image portions and non-image portions on surfaces of photosensitive drums according to one or more aspects of the present disclosure.
Figure 6B:
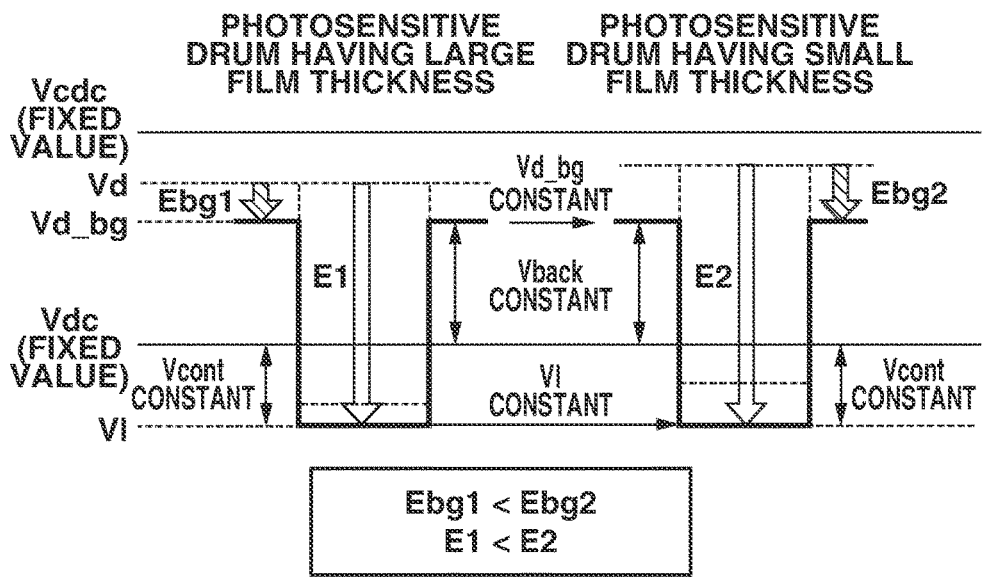

FIGS. 6A and 6B are diagrams illustrating the potentials of image portions and non-image portions on the surfaces of photosensitive drums 5. For example, as illustrated in FIG. 6A, a case in which the developing potential Vdc and the charging potential Vd of a photosensitive drum 5 having a large film thickness are set so that a difference between the developing potential Vdc and the charging potential Vd, or back contrast Vback (=Vd−Vdc), is in a desired state will be described. In such a case, the absolute value of the charging potential Vd to a photosensitive drum 5 having a small film thickness is large, and the back contrast Vback increases. If the back contrast Vback is high, toner failed to be charged in a normal polarity (in the case of reversal development as in the present exemplary embodiment, toner charged not to a negative polarity but to 0 to a positive polarity) transfers from the developing roller 8 to the non-image portion to cause fogging.

Since the charging potential Vd increases, an exposure potential Vl (VL) of the photosensitive drum 5 having a small film thickness also increases if the first light emission amount for normal light emission is configured to be constant. This reduces a difference value between the developing potential Vdc and the exposure potential Vl (VL), or developing contrast Vcont (=Vdc−Vl). Toner fails to be sufficiently transferred from the developing roller 8 to the photosensitive drums 5 in an electrostatic manner, and there occurs low density of a black solid image.

The optical scanning device 9 then emits the first light emission amount of light to the image portions of the photosensitive drums 5, emits the second light emission amount of light to the non-image portions of the photosensitive drums 5, and adjusts the first and second light emission amounts according to the usage of the photosensitive drums 5. Specifically, as illustrated in FIG. 6B, if a photosensitive drum 5 has a large film thickness, the laser diode LD401 emits a first light emission amount of light corresponding to an exposure amount E1 and a second light emission amount of light corresponding to an exposure amount Ebg1. The target potential of the photosensitive drum 5 after the light emission of the second light emission amount will be denoted by Vd_bg. The exposure amount Ebg1 is adjusted so that the back contrast Vback defined by Vd_bg−Vdc becomes a potential that does not cause fogging. Assuming that Vl is the potential of the photosensitive drum 5 after the light emission of the first light emission amount, the exposure amount E1 is adjusted so that the development contract Vcont defined by Vdc−Vl becomes a potential that does not cause low density.

If a photosensitive drum 5 has a small film thickness, the laser diode LD401 emits a first light emission amount of light corresponding to an exposure amount E2 (>E1) and a second light emission amount of light corresponding to an exposure amount Ebg2 (>Ebg1). As with a large film thickness, the potential of the photosensitive drum 5 after the light emission of the second light emission amount will be denoted by Vd_bg. The exposure amount Ebg2 is adjusted so that the back contrast Vback defined by Vd_bg−Vdc becomes a potential that does not cause fogging. Assuming that Vl is the potential of the photosensitive drum 5 after the light emission of the first light emission amount, the exposure amount E2 is adjusted so that the development contrast Vcont defined by Vdc−Vl becomes a potential that does not cause low density. The first and second light emission amounts are thus changed according to the usage of the photosensitive drum 5, whereby the back contract Vback and the development contact Vcont are maintained constant to suppress a drop in image quality.

[Adjustment of Light Emission Amounts According to Use States of Photosensitive Drums 5]

Specific adjustments for changing the first and second light emission amounts of the laser diodes LD401Y to LD401K according to use states (film thicknesses) of the photosensitive drums 5 will be described. FIGS. 7A to 7C are tables illustrating a relationship between the use states of the photosensitive drums 5Y to 5K and the target values of the light emission amounts of the corresponding laser diodes LD401Y to LD401K. FIG. 7A illustrates the target values of the first light emission amounts, FIG. 7B the target values of the second light emission amounts, and FIG. 7C the target values of the third light emission amounts.

In the present exemplary embodiment, a cumulative value of the number of sheets printed by the photosensitive drums 5 is used as a parameter related to the use states (film thicknesses) of the photosensitive drums 5. As the cumulative value of the number of printed sheets increases, the film thicknesses decrease. For example, an initial use state is defined such that the number of printed sheets is 0 to 400. An intermediate use state is defined such that the number of printed sheets is 401 to 800. A final use state is defined such that the number of printed sheets is 801 to 1200 (up to the life of the photosensitive drums 5). The first light emission amounts of the laser diodes LD401Y and LD401K are set to P(a1) in the initial use state, P(a2) in the intermediate use state, and P(a3) in the final use state. The first light emission amounts of the laser diodes LD401M and LD401C are set to P(b1) in the initial state, P(b2) in the intermediate use state, and P(b3) in the final use state. The second light emission amounts of the laser diodes LD401Y and LD401K are set to P(c1) in the initial use state, P(c2) in the intermediate use state, and P(c3) in the final use state. The second light emission amounts of the laser diodes LD401M and LD401C are set to P(d1) in the initial use state, P(d2) in the intermediate use state, and P(d3) in the final use state. The third light emission amounts of the laser diodes LD401Y to LD401K are set to P(P1) regardless of the use states of the photosensitive drums 5.

The distinction of the use states is not limited thereto. More than four ranges may be set. The first to third light emission amounts may be set as finely as the number of ranges divided. The numbers of printed sheets to divide the ranges are not limited to the foregoing, either. The numbers of printed sheets may be set as appropriate according to the life (film thicknesses) of the photosensitive drums 5.

Figure 8:
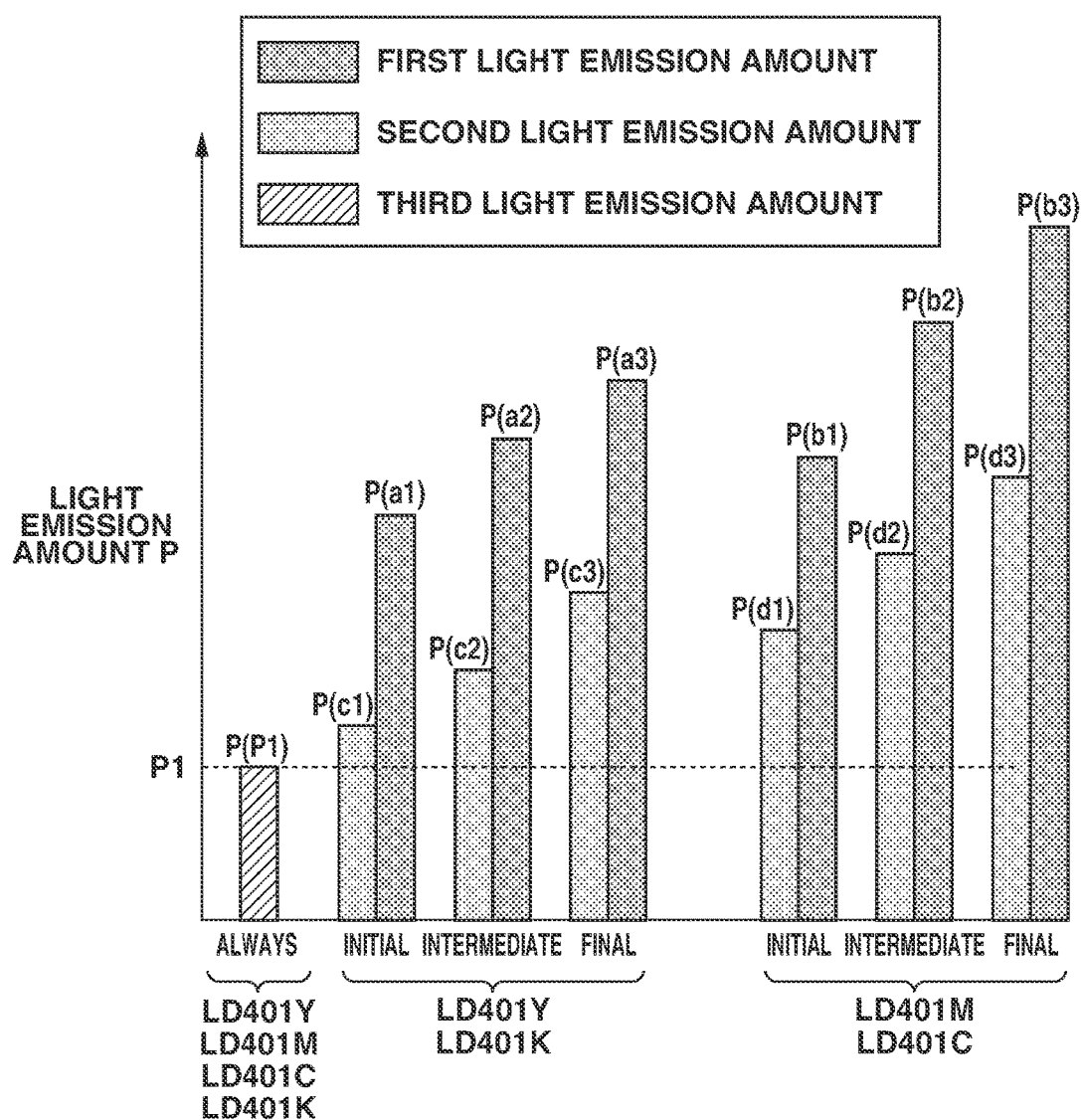
FIG. 8 is a graph illustrating first to third light emission amounts according to one or more aspects of the present disclosure.

FIG. 8 is a graph illustrating the first to third light emission amounts illustrated in FIGS. 7A, 7B, and 7C. As illustrated in FIG. 8, the first to third light emission amounts to be set satisfy the following relationships:

$$P(c1)<P(c2)<P(c3)<P(a1)<P(a2)<P(a3)$$

$$P(d1)<P(d2)<P(d3)<P(b1)<P(b2)<P(b3)$$

$$P(P1)<P(c1)<P(d1)$$

In such a manner, the target values of the first and second light emission amounts are set to increase as the use states of the photosensitive drums 5 advance from the initial to the final (as the cumulative value of the number of printed sheets increases). In the same use state (the same cumulative value of the number of printed sheets), the first and second light emission amounts of the laser diodes LD401Y and LD401K are different from those of the laser diodes LD401M and LD401C because the numbers of mirrors 605 arranged on the respective optical paths differ as described above. If the numbers of mirrors 605 arranged on the optical paths are the same, the first and second light emission amounts of the laser diodes LD401Y and LD401K and those of the laser diodes LD401M and LD401C may be controlled to be the same.

As illustrated in FIG. 9, such adjustments of the first to third light emission amounts are performed before image formation. The engine controller 531 obtains information about the use states (cumulative value of the number of printed sheets) of the photosensitive drums 5Y to 5K. Based on the tables of FIGS. 7A to 7C, the engine controller 531 then sets the reference voltages Vref11, Vref21, and Vref31 serving as references in performing APC on the respective first, second, and third light emission amounts of the corresponding laser diodes LD401Y to LD401K. Specifically, the engine controller 531 outputs the PWM1 signal (duty value) for setting the reference voltage Vref11, the PWM2 signal (duty value) for setting the reference voltage Vref21, and the PWM3 signal (duty value) for setting the reference voltage Vref31 to the laser driving circuits 406. The engine controller 531 then performs the foregoing first, second, and third light emission amount APCs.

The cumulative value of the number of sheets printed by the photosensitive drums 5 is counted by a not-illustrated counter and stored in a not-illustrated memory. In the present exemplary embodiment, the information about the cumulative value of the number of printed sheets is used as information (parameter) about the film thicknesses of the photosensitive drums 5. However, this is not restrictive. For example, a value related to the cumulative numbers of rotations of the photosensitive drums 5 or a value related to the cumulative numbers of rotations of the developing rollers 8 or the charging rollers 7 may be used as the information about the film thicknesses of the photosensitive drums 5. A toner patch for detecting toner density may be formed, and the toner density of the toner patch may be detected. The information about the measurement result on which the film thicknesses are reflected may be used as the information about the film thicknesses of the photosensitive drums 5. Alternatively, the film thicknesses of the photosensitive drums 5 may be detected by sensors, and the detection results may be used as the information about the film thicknesses of the photosensitive drums 5.

[Light Emission Amount and Execution Period of Third Light Emission APC]

Next, the light emission amount of and a period in which the third light emission APC is performed according to the present exemplary embodiment will be described with reference to FIGS. 8 and 9. As described above, during an initial operation of the image forming apparatus 50, the third light emission APC is controlled to be completed before the execution of the second and first light emission amount APCs as illustrated in FIG. 5. During a steady operation like when the image forming apparatus 50 is forming an image, the third light emission amount APC is performed within one line scan sequence as illustrated in FIG. 9.

In FIG. 9, in a period before time t0, the laser diodes LD401 are driven to emit light at the target values of the first light emission amounts, and the first light emission amount APC is performed. At time t0 when the first light emission amounts of light are emitted, the BD signal is detected. That is, the first light emission amount APC is performed at timing at least before the detection of the BD signal (horizontal synchronization signal). Time t0 is the rising timing of the BD waveform and the start timing of one line scan sequence. In a margin area period from time t0 to time t1 corresponding to a margin area of the recording material, the laser diodes LD401 are driven to emit light at the target values of the second light emission amounts, and the second light emission amount APC is performed to adjust the second light emission amounts. That is, the second light emission amount APC is performed in a period at least after the detection of the BD signal (horizontal synchronization signal) and at least part of an image mask period. In a period from time t1 to time t2, the laser diodes LD401 are driven to emit light at the target value (P(P1)) of the third light emission amounts, and the third light emission amount APC is performed to adjust the third light emission amounts. As illustrated in FIG. 8, the target value (P(P1)) of the third light emission amounts is smaller than the lower limit value (P(c1)) of the second light emission amounts. The target value (P(P1)) of the third light emission amounts is a light emission amount that will not cause an image defect even if stray light occurs. The third light emission amount APC is performed until time t2. Then, in a period from time t2 to time t5, weak emission for a non-image portion is performed. In a period from time t3 to time t4, normal light emission for an image portion is performed. The period from time t2 to time t5 corresponds to the image forming area. While the weak emission for a non-image portion is started at time t2 as an example, this is not restrictive. The normal light emission for an image portion may be started at time t2 if image formation is started at time t2 according to the image data. In a period from time t6 to time t7, the laser diodes LD401 are driven to emit light at the target values of the first light emission amounts to perform the first light emission amount APC and adjust the first light emission amounts. The timing of the first light emission amount APC is determined with reference to the detection timing of the BD signal (horizontal synchronization signal) corresponding to the previous scan line.

Figure 12:
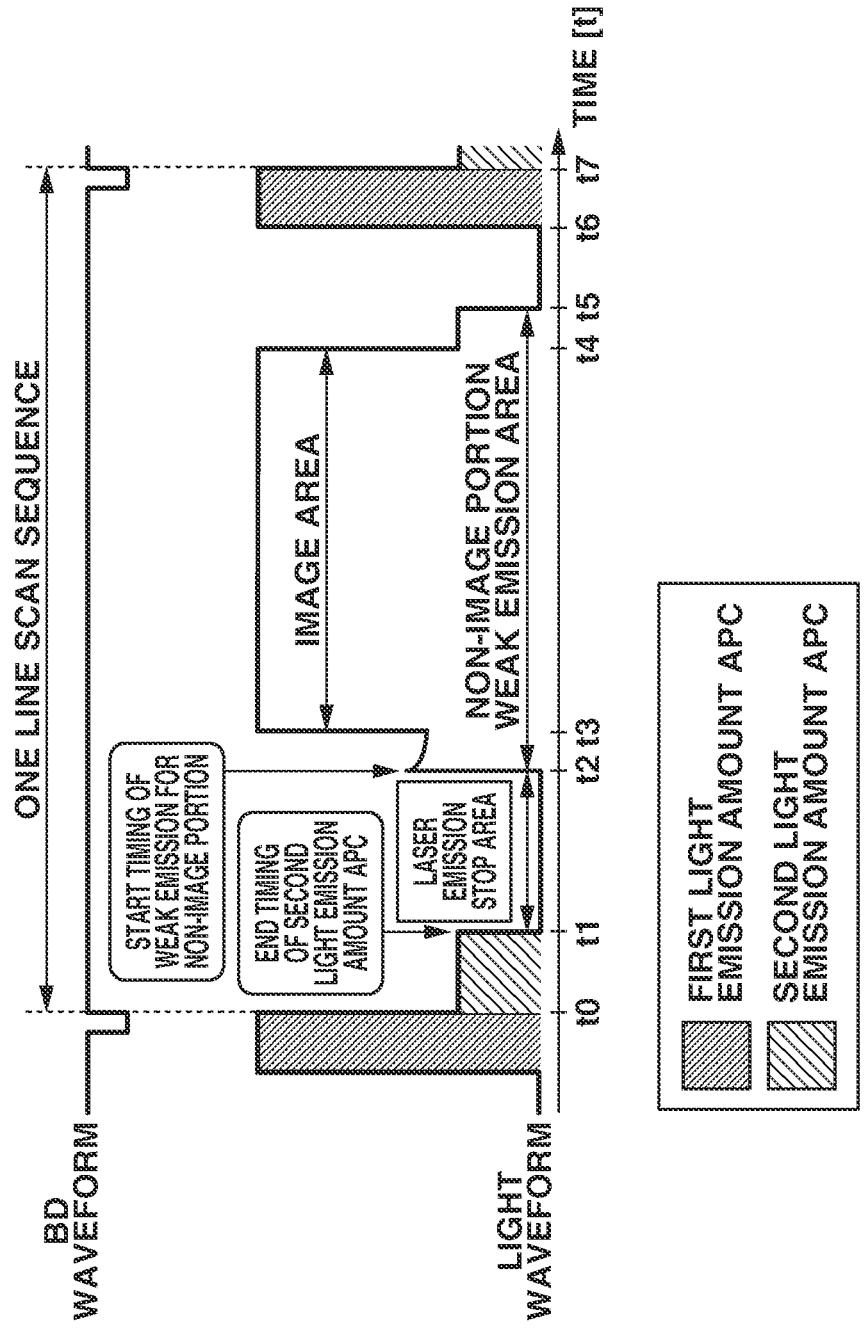
FIG. 12 is a diagram illustrating conventional APCs according to one or more aspects of the present disclosure.

As described above, the third light emission amount APC is performed between when the second light emission amount APC is ended at time t1 and when the weak emission for a non-image portion is performed at time t2. The laser diodes LD401 do not stop emitting light before the weak emission starts at time t2. This can suppress the occurrence of droop when the weak emission starts at time t2 as described with reference to FIG. 12. In other words, the third light emission amount APC can be performed to suppress temperature changes of the laser elements and suppress image defects such as fogging due to droop at the start timing of the weak emission. It should be noted that the third light emission amount APC does not necessarily need to be continued during the period before time t2. For example, the third light emission amount APC may be intermittently performed as far as the effect of droop due to the temperature of the laser diodes LD401 can be suppressed. The light emission of the laser diodes LD401 may be stopped for a short time at time t2 when the third light emission amount APC is switched to the weak emission, as far as the effect of droop due to the temperature of the laser diodes LD401 can be suppressed.

In the present exemplary embodiment, the third light emission amount APC is described to be performed in the period from time t1 to time t2. However, this is not restrictive. For example, the light emission amounts of the laser diodes LD401 in the period from time t1 to time t2 may be determined based on the second light emission amounts determined by the second light emission amount APC. For example, the third light emission amounts may be determined by the second light emission amounts×80%. The laser diodes LD401 are then driven to emit light in the period from time t1 to time t2, and the weak emission can be started at time t2 to suppress droop. If the light emission amounts for the laser diodes LD401 to emit light of in the period from time t1 to time t2 are smaller than the second light emission amounts, or equivalently, light emission amounts that will not cause an image defect even if stray light occurs, the third light emission amount APC may be performed. The third light emission amounts may be determined from the second light emission amounts without performing the third light emission amount APC.

A second exemplary embodiment will be described below. In the foregoing first exemplary embodiment, the third light emission amounts are described to be a fixed light emission amount P(P1) regardless of the usage of the photosensitive drums 5. The present exemplary embodiment describes a case in which the third light emission amounts are also changed according to the usage of the photosensitive drums 5. The configurations of the image forming apparatus 50, the optical scanning device 9, and the laser driving circuits 406 are the same as those of the foregoing first exemplary embodiment. A detailed description thereof will be omitted here.

[Adjustment of Light Emission Amounts According to Use States of Photosensitive Drums 5]

Specific adjustments for changing the first, second, and third light emission amounts of the laser diodes LD401Y to LD401K according to the use states (film thicknesses) of the photosensitive drums 5 will be described. FIGS. 10A to 10C are tables illustrating a relationship between the use states of the photosensitive drums 5Y to 5K and the target values of the light emission amounts of the corresponding laser diodes LD401Y to LD401K. FIG. 10A illustrates the target values of the first light emission amounts, FIG. 10B the target values of the second light emission amounts, and FIG. 10C the target values of the third light emission amounts.

In the present exemplary embodiment, the cumulative value of the number of sheets printed by the photosensitive drums 5 is used as the parameter related to the use states (film thicknesses) of the photosensitive drums 5. As the cumulative value of the number of printed sheets increases, the film thicknesses decrease. The first and second light emission amounts are the same as in the foregoing first exemplary embodiment. A description thereof will thus be omitted here. The third light emission amounts of the laser diodes LD401Y and LD401K are set to P(M1) in the initial use state, P(M2) in the intermediate use state, and P(M3) in the final use state. The third light emission amounts of the laser diodes LD401M and LD401C are set to P(N1) in the initial use state, P(N2) in the intermediate use state, and P(N3) in the final use state. Like the foregoing first exemplary embodiment, the distinction of the use states is not limited thereto. More than four ranges may be set. The first to third light emission amounts may be set as finely as the number of ranges divided. The numbers of printed sheets to divide the ranges are not limited thereto, either. The numbers of printed sheets may be appropriately set according to the life (film thicknesses) of the photosensitive drums 5.

Figure 11:
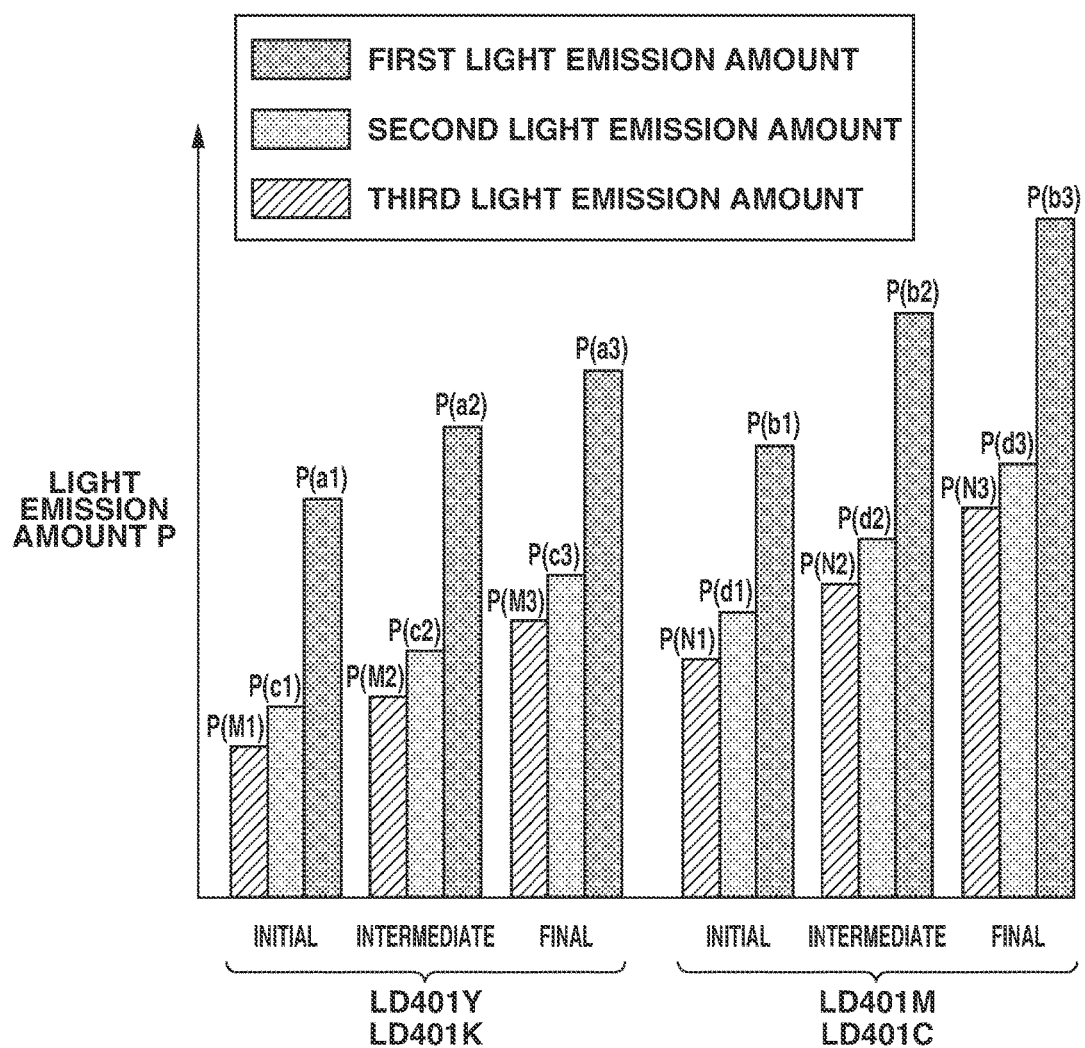
FIG. 11 is a graph illustrating the first to third light emission amounts according to one or more aspects of the present disclosure.

FIG. 11 is a graph illustrating the first to third light emission amounts listed in FIGS. 10A, 10B, and 10C. As illustrated in FIG. 11, the third light emission amounts to be set satisfy the following relationship:

$P(M1)<P(M2)<P(M3)$ $P(N1)<P(N2)<P(N3)$ $P(M1)<P(N1), P(M2)<P(N2)$, and $P(M3)<P(N3)$ The target values of the first, second, and third light emission amounts are thus set to increase as the use states of the photosensitive drums 5 advance from the initial to the final (as the cumulative value of the number of printed sheets increases). In the same use state (the same cumulative value of the number of printed sheets), the first to third light emission amounts of the laser diodes LD401Y and LD401K are different from those of the laser diodes LD401M and LD401C because the numbers of mirrors 605 arranged on the respective optical paths differ as described above. If the numbers of mirrors 605 arranged on the optical paths are the same, the first to third light emission amounts of the laser diodes LD401Y and LD401K and those of the laser diodes LD401M and LD401C may be controlled to be the same.

As illustrated in FIG. 9, like the foregoing first exemplary embodiment, such adjustments of the first to third light emission amounts are performed before image formation. The engine controller 531 obtains information about the use states (cumulative value of the number of printed sheets) of the photosensitive drums 5Y to 5K. Based on the tables of FIGS. 10A to 10C, the engine controller 531 then sets the reference voltages Vref11, Vref21, and Vref31 serving as references in performing APC on the respective first, second, and third light emission amounts of the corresponding laser diodes LD401Y to LD401K. Specifically, the engine controller 531 outputs the PWM1 signal (duty value) for setting the reference voltage Vref11, the PWM2 signal (duty value) for setting the reference voltage Vref21, and the PWM3 signal (duty value) for setting the reference voltage Vref31 to the laser driving circuits 406. The engine controller 531 then performs the foregoing first to third light emission amount APCs.

The cumulative value of the number of sheets printed by the photosensitive drums 5 is counted by a not-illustrated counter and stored in a not-illustrated memory. In the present exemplary embodiment, the information about the cumulative value of the number of printed sheets is used as the information (parameter) about the film thicknesses of the photosensitive drums 5. However, this is not restrictive. For example, a value related to the cumulative numbers of rotations of the photosensitive drums 5 or a value related to the cumulative numbers of rotations of the developing rollers 8 or the charging rollers 7 may be used as the information about the film thicknesses of the photosensitive drums 5. A toner patch for detecting toner density may be formed, and the toner density of the toner patch may be detected. The information about the measurement result on which the film thicknesses are reflected may be used as the information about the film thicknesses of the photosensitive drums 5. Alternatively, the film thicknesses of the photosensitive drums 5 may be detected by sensors, and the detection results may be used as the information about the film thicknesses of the photosensitive drums 5.

[Light Emission Amounts and Execution Period of Third Light Emission APC]

Next, the light emission amounts of and the period in which the third light emission amount APC is performed according to the present exemplary embodiment will be described with reference to FIGS. 9 and 11. As described above, during an initial operation of the image forming apparatus 50, the third light emission amount APC is controlled to be completed before the execution of the second and first light emission amount APCs as illustrated in FIG. 5. During a steady operation like when the image forming apparatus 50 is forming an image, the third light emission amount APC is performed within one line scan sequence as illustrated in FIG. 9.

In FIG. 9, in the period before time t0, the laser diodes LD401 are driven to emit light at the target values of the first light emission amounts and the first light emission amount APC is performed. At time t0 when the first light emission amounts of light is emitted, the BD signal is detected. Time t0 is the rising timing of the BD waveform, and the start timing of one line scan sequence. In the period from time t0 to time t1, the laser diodes LD401 are driven to emit light at the target values of the second light emission amounts, and the second light emission amount APC is performed to adjust the second light emission amounts. In the period from time t1 to time t2, the laser diodes LD401 are driven to emit light at the target values of the third light emission amounts and the third light emission amount APC is performed to adjust the third light emission amounts. As illustrated in FIG. 11, the target values of the third light emission amounts are light emission amounts smaller than the second light emission amounts. The third light emission amounts are light emission amounts that will not cause an image defect even if stray light occurs. In the present exemplary embodiment, the target values of the third light emission amount APC are changed according to the use states of the photosensitive drums 5. The third light emission amounts can thus be appropriately adjusted according to the state of the image forming apparatus 50 so that stray light will not occur. After the third light emission amount APC is performed up to time t2, weak emission for a non-image portion is performed in the period from time t2 to time t5. In the period t3 to t4, normal light emission for an image portion is further performed. While the weak emission for a non-image portion is started at time t2 as an example, this is not restrictive. The normal light emission for an image portion may be started at time t2 if image formation is started at time t2 according to the image data.

In such a manner, the third light emission amount APC is performed between when the second light emission amount APC is ended at time t1 and when the weak emission for a non-image portion is performed at time t2. The laser diodes LD401 do not stop emitting light before the weak emission is started at time t2. This can suppress the occurrence of droop when the weak emission is started at time t2 as described with reference to FIG. 12. In other words, the third light emission amount APC can be performed to suppress temperature changes of the laser elements and suppress image defects such as fogging due to droop at the start timing of the weak emission. The third light emission amount APC does not necessarily need to be continued during the period before time t2. For example, the third light emission amount APC may be intermittently performed as far as the effect of droop due to the temperature of the laser diodes LD401 can be suppressed. The light emission of the laser diodes LD401 may be stopped for a short time at time t2 when the third light emission amount APC is switched to the weak emission, as far as the effect of droop due to the temperature of the laser diodes LD401 can be suppressed.

In the present exemplary embodiment, the third light emission amount APC is described to be performed in the period from time t1 to time t2. However, this is not restrictive. For example, the light emission amounts of the laser diodes LD401 in the period from time t1 to time t2 may be determined based on the second light emission amounts determined by the second light emission amount APC. For example, the third light emission amounts may be determined by the second light emission amounts×80%. The laser diodes LD401 are then driven to emit light in the period from time t1 to time t2, and the weak emission can be started at time t2 to suppress droop. If the light emission amounts for the laser diodes LD401 to emit light of in the period from time t1 to time t2 are smaller than the second light emission amounts, or equivalently, light emission amounts that will not cause an image defect even if stray light occurs, the third light emission amount APC may be performed. The third light emission amounts may be determined from the second light emission amounts without performing the third light emission amount APC.

According to an exemplary embodiment of the present disclosure, laser elements can emit light with droop suppressed.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-168585, filed Aug. 30, 2016, which is hereby incorporated by reference herein in its entirety.

What is claimed is:

1. An image forming apparatus comprising:
one or more processors; and
one or more memories storing instructions, when executed by the one or more processors, causing the information forming apparatus to function as:
a charging unit configured to charge a photosensitive member;
a light irradiation unit configured to emit a first light emission amount of light for forming an electrostatic latent image in an image portion, a second light emission amount of light for controlling a potential of a non-image portion, and a third light emission amount of light,
wherein the second light emission amount is smaller than the first light emission amount, and the third light emission amount is smaller than the second light emission amount;
a detection unit configured to detect a light emission intensity of the light emitted from the light irradiation unit;
a control unit; and an adjustment unit configured to adjust a driving current to be supplied to the light irradiation unit based on the light emission intensity detected, so as to adjust an amount of the light emitted from the light irradiation unit,
wherein the adjustment unit includes a first adjustment unit configured to adjust a first driving current to adjust the first light emission amount, a second adjustment unit configured to adjust a second driving current to adjust the second light emission amount and a third adjustment unit configured to adjust a third driving current to adjust the third light emission amount,
wherein the first adjustment unit is configured to adjust, in a first period, the first driving current at timing at least before detection of a horizontal synchronization signal,
wherein the second adjustment unit is configured to adjust, in a second period, the second driving current in a period at least after the detection of the horizontal synchronization signal and at least part of an image mask period, and
wherein the third adjustment unit is configured to adjust, in a third period, the third driving current in a period after the second driving current is adjusted,
wherein the control unit switches to a fourth period subsequent to the third period and switches to a fifth period subsequent to the fourth period,
wherein the fourth period is a period in which the second emission amount of light is emitted from the light irradiation unit based on the second driving current adjusted by the second adjustment unit, and
wherein the fifth period is a period in which the first emission amount of light is emitted from the light irradiation unit based on the first driving current adjusted by the first adjustment unit.

2. The image forming apparatus according to claim 1, further comprising a switching unit configured to switch between a first state in which the driving current obtained by adding the first driving current, the second driving current, and the third driving current is supplied to the light irradiation unit so that the light irradiation unit emits the first light emission amount of light, a second state in which the driving current obtained by adding the second and third driving currents without adding the first driving current is supplied to the light irradiation unit so that the light irradiation unit emits the second light emission amount of light, and a third state in which the third driving current is supplied as the driving current to the light irradiation unit without adding the first and second driving current so that the light irradiation unit emits the third light emission amount of light.

3. The image forming apparatus according to claim 1, wherein the first adjustment unit is configured to adjust the first driving current, the second adjustment unit is configured to adjust the second driving current, and the third adjustment unit is configured to adjust the third driving current according to usage of the photosensitive member.

4. The image forming apparatus according to claim 3, wherein the usage of the photosensitive member refers to a cumulative value of a number of printed sheets of images, a value related to a cumulative number of rotations of the photosensitive member, or a value related to a film thickness of the photosensitive member.

5. The image forming apparatus according to claim 1, wherein the third adjustment unit is configured to adjust the third driving current according to the second driving current adjusted by the second adjustment unit.

6. The image forming apparatus according to claim 1, wherein the second adjustment unit is configured to adjust the second driving current in a sixth period that is after the fifth period and before switching back to the first period so as to detect a horizontal synchronization signal for a next scan line.

7. The image forming apparatus according to claim 1,
wherein the first adjustment unit is configured to adjust the first driving current based on a difference between the light emission intensity of the light detected by the detection unit and a first target light emission intensity of the first light emission amount,
wherein the second adjustment unit is configured to adjust the second driving current based on a difference between the light emission intensity of the light detected by the detection unit and a second target light emission intensity of the second light emission amount, and
wherein the third adjustment unit is configured to adjust the third driving current based on a difference between the light emission intensity of the light detected by the detection unit and a third target light emission intensity of the third light emission amount.

8. The image forming apparatus according to claim 1,
wherein the second driving current is a current higher than a threshold current for emitting laser light from the light irradiation unit, and
wherein the light irradiation unit is configured to emit laser light when supplied with the second driving current.

9. The image forming apparatus according to claim 1, wherein the second and third light emission amounts are light emission amounts for not adhering toner to the photosensitive member.

10. The image forming apparatus according to claim 1, further comprising a switching unit configured to switch between a first state in which the driving current obtained by adding the first driving current and the second driving current is supplied to the light irradiation unit so that the light irradiation unit emits the first light emission amount of light, a second state in which the second driving current is supplied as the driving current to the light irradiation unit without adding the first driving current so that the light irradiation unit emits the second light emission amount of light, and a third state in which the third driving current is supplied as the driving current to the light irradiation unit so that the light irradiation unit emits the third light emission amount of light.

11. The image forming apparatus according to claim 1, wherein the light irradiation unit is configured to emit the first light emission amount of light, whereby a potential of the photosensitive member changes to a potential for forming an electrostatic latent image according to image data.

12. The image forming apparatus according to claim 1, wherein the first adjustment unit is further configured to adjust the first driving current with reference to detection timing of the horizontal synchronization signal corresponding to a previous scan line.

13. The image forming apparatus according to claim 1, further comprising a plurality of the photosensitive members and a plurality of the charging units respectively corresponding to the plurality of the photosensitive members,
wherein a power supply applies voltages to the plurality of the charging units.

14. The image forming apparatus according to claim 1, further comprising a plurality of the photosensitive members and a plurality of development units respectively corresponding to the plurality of the photosensitive members, wherein a power supply applies voltages to the plurality of development units.

15. An image forming apparatus comprising:
a charging unit configured to charge a photosensitive member;
a light irradiation unit configured to emit a first light emission amount of light for forming an electrostatic latent image in an image portion, a second light emission amount of light for controlling a potential of a non-image portion, and a third light emission amount of light,
wherein the second light emission amount is smaller than the first light emission amount, and the third light emission amount is smaller than the second light emission amount;
a detection unit configured to detect a light emission intensity of the light emitted from the light irradiation unit;
a control unit configured to acquire the third light emission amount based on a use state of the first light emission amount and the second light emission amount; and
a switching unit configured to switch between a first state in which a driving current obtained by adding a first driving current, a second driving current, and a third driving current is supplied to the light irradiation unit so that the light irradiation unit emits the first light emission amount of light, a second state in which the driving current obtained by adding the second and third driving currents without adding the first driving current is supplied to the light irradiation unit so that the light irradiation unit emits the second light emission amount of light, and a third state in which the third driving current is supplied as the driving current to the light irradiation unit without adding the first and second driving current so that the light irradiation unit emits the third light emission amount of light,
wherein the control unit is configured to switch the light irradiation unit to, subsequent to a period of emitting at least the third light emission amount of light, a period of emitting the second light emission amount of light, and
wherein the control unit further switches to, subsequent to a period of emitting the second light emission amount of light, a period of emitting the first light emission amount of light.

* * * * *